United States Patent [19]
Cattaneo

[11] Patent Number: 5,361,684
[45] Date of Patent: Nov. 8, 1994

[54] APPARATUS FOR HEATING AND/OR COOKING FOODS IN WATER

[76] Inventor: Gilberto Cattaneo, Koenigsbergerstrasse, 53, Moeglingen, Germany, 7141

[21] Appl. No.: 52,773

[22] Filed: Apr. 26, 1993

[30] Foreign Application Priority Data

Apr. 28, 1992 [IT] Italy .................. B092A000154

[51] Int. Cl.$^5$ ........................... A47J 27/16
[52] U.S. Cl. ..................... 99/410; 219/401; 126/369; 99/403
[58] Field of Search ............ 99/403, 407, 408, 410, 99/336; 219/401; 126/369, 21 A

[56] References Cited

U.S. PATENT DOCUMENTS

| | | | |
|---|---|---|---|
| 3,859,981 | 1/1975 | Yoshida | 99/410 |
| 4,505,194 | 3/1985 | Bishop et al. | 99/407 |
| 4,898,091 | 2/1990 | Rozak et al. | 99/407 |
| 5,029,519 | 7/1991 | Boyen | 99/403 |

FOREIGN PATENT DOCUMENTS

| | | | |
|---|---|---|---|
| 2832659 | 2/1979 | Germany | 99/408 |
| 3723937 | 2/1988 | Germany | 99/410 |

*Primary Examiner*—David A. Scherbel
*Assistant Examiner*—Reginald L. Alexander
*Attorney, Agent, or Firm*—Hoffmann & Baron

[57] ABSTRACT

The invention relates to an apparatus for heating and/or cooking food in water, of the type comprising at least a first tub to house water at boiling point and containing at its inside heating elements of the water, and at least one perforated container for the foods housable in the first tub; the first tub is contained inside a first box structure, superiorly open and superiorly sealedly connected to the upper edges of the first tub, and above the first tub an intercepting wall of the steam exiting from the said first tub is arranged; the apparatus further comprises a longitudinal aperture made at a portion of the connection zone of the upper edges of the first tub to the first box structure, a second box structure communicating with the inside of the first box structure and an aspirating element exhibiting its inlet in communication with the chamber existing between the first tub and the intercepting wall and its outlet communicating with the inside of the second box structure.

17 Claims, 2 Drawing Sheets

APPARATUS FOR HEATING AND/OR COOKING FOODS IN WATER

BACKGROUND OF THE INVENTION

The invention relates to an apparatus for heating and/or cooking food in water.

In particular, the present invention concerns an apparatus, usable in either private domestic kitchens or community kitchens where it is necessary to heat, in the cases of pre-cooked or frozen foods, or to cook, in water, quantities of foods constituted in particular by Italian pasta asciutta.

The prior art embraces apparatus of the above-mentioned type comprising substantially a water containment tub in which heating elements, constituted by electric resistors, are housed. For the heating or cooking of foodstuffs, one or more perforated containers containing the food to be cooked are immersed in the said tub (for the sake of simplicity only one container is immersed in this description), which food is kept immersed in the boiling water for the time necessary to cook the food. The boiling water contained in the said tub produces a considerable and continuous amount of steam which is lost into the atmosphere in which the apparatus is working:

the further conspicuous quantity of steam which develops each time the container is extracted from the tub at the end of the cooking time is also lost in the same way.

This continuous dispersion of the steam into the atmosphere gives rise to important drawbacks, both with regard to the steamy conditions, caused by the above-mentioned steam escapes, and rather unpleasant for the operators of the apparatus, and with regard to the condensation settling on surfaces near the apparatus itself.

A further drawback of the above-described apparatus derives from the fact that the foods, and in particular pasta asciutta, on termination of cooking and after the container in which they are housed has been extracted from the said tub, frequently remain in the container itself for a certain time, above the tub, before being tipped on to plates or serving containers. When this happens, the foods dry up excessively and lose the fragrance they would have had if served immediately.

SUMMARY OF THE INVENTION

The invention, as it is characterised in the claims that follow, solves the problem of providing an apparatus for the heating and/or cooking of foods in water, of the type comprising at least a first tub for the housing of water at boiling temperature and containing internally heating means of the water, and at least one perforated container for the said foods housable inside the said first tub, the said tub being contained inside a first box structure which is superiorly open and superiorly sealedly connected to the upper edges of the first tub, and there being arranged above the said first tub an intercepting wall of the steam exiting from the said first tub, characterised in that it comprises a longitudinal opening made at a portion of the connection zone of the upper edges of the said first tub to the said first box structure, a second box structure communicating with the inside of the said first box structure, and aspirating means exhibiting an inlet communicating with the chamber existing between the said first tub and the said intercepting wall and the outlet communicating with the inside of the said second box structure.

Preferably the said apparatus comprises a plurality of perforated walls arranged one on the other internally to the said second box structure. Further, according to a preferred embodiment of the present invention, the said walls exhibit their horizontal generating lines and are arranged inclined with respect to a horizontal plane according to equal corners but oppositely placed on alternate walls starting from the top and moving downwards.

BRIEF DESCRIPTION OF THE DRAWINGS

The technical characteristics of the invention according to the above-defined aims, are clearly evident from the following claims, and the advantages of the invention will better emerge from the detailed description that follows, made with reference to the accompanying drawings which represent an embodiment here included only as a non-limiting example, and in which:

DESCRIPTION OF THE PREFERRED EMBODIMENTS

Figure 1:
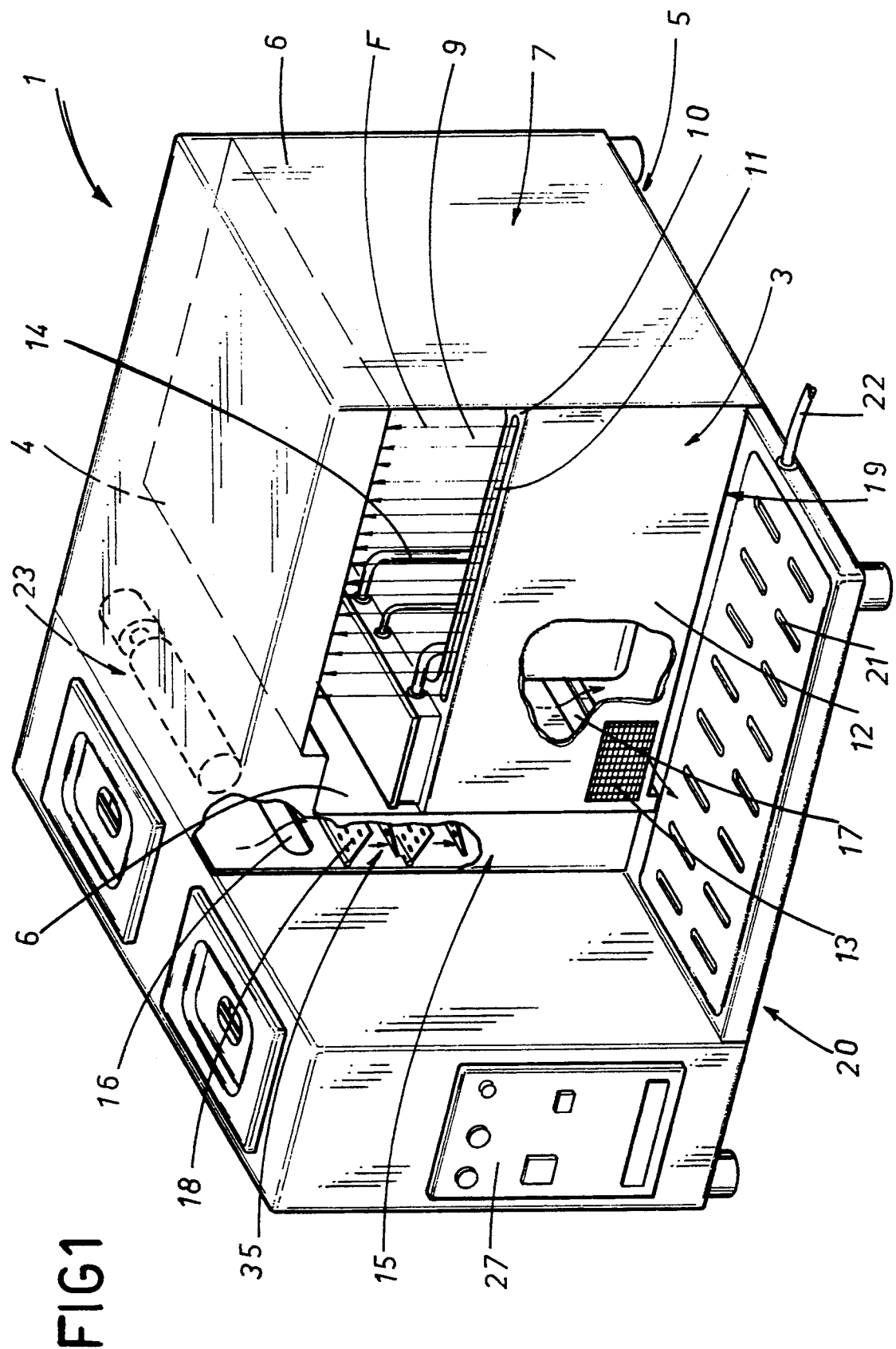
FIG. 1 shows, in a schematic perspective view, with some particulars sectioned or removed in order to improve clarity, an apparatus for the heating and/or cooking of foods in water, made according to the present invention.
Figure 2:
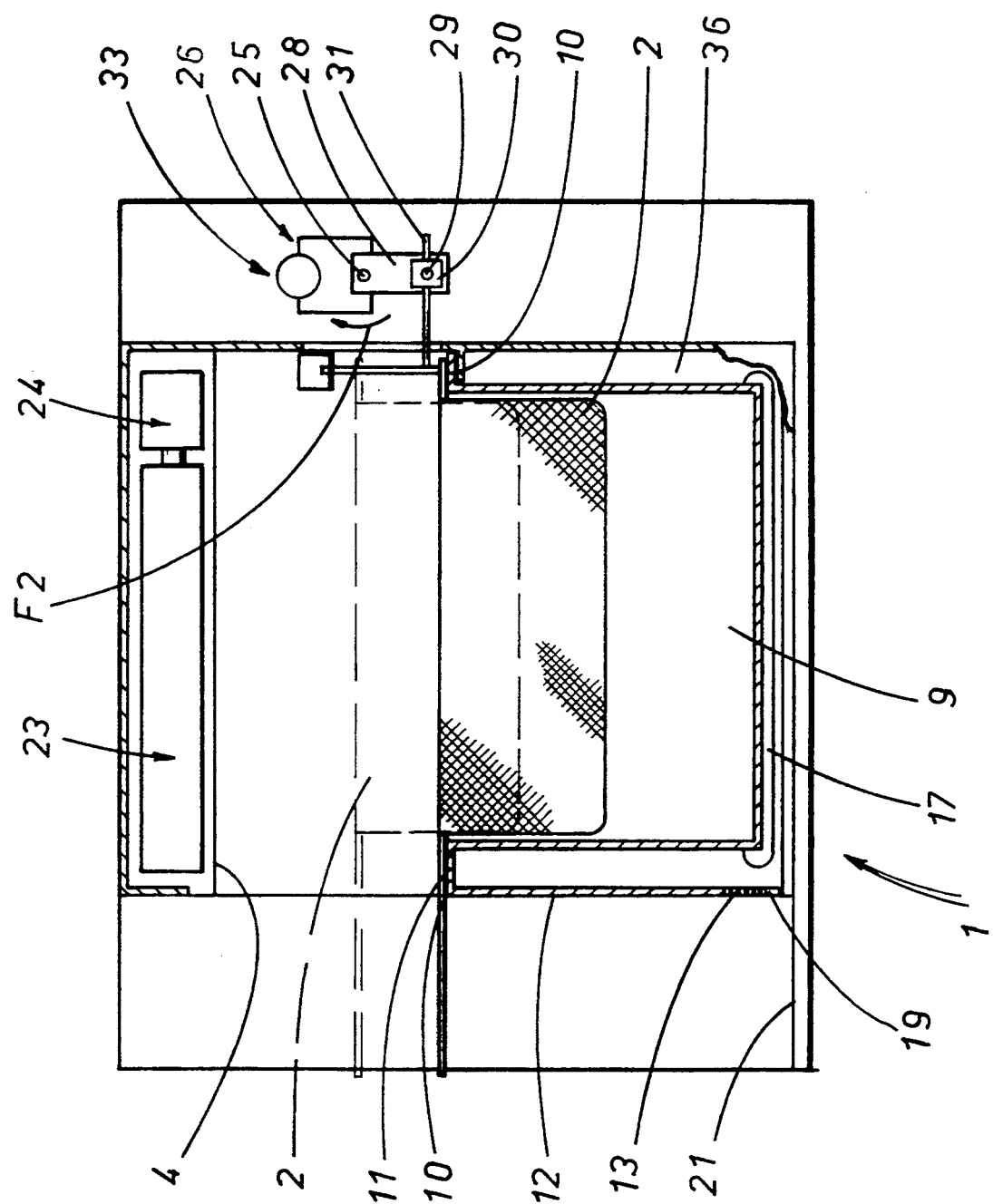
FIG. 2 shows in a schematic section view, the apparatus of FIG. 1.

With reference to the figures, 1 denotes in its entirety an apparatus destined to be used for the heating of foods, in the case that the foods are precooked or frozen, or for cooking dried or raw foods in water, usable in particular for the heating and/or the cooking of Italian pasta asciutta in perforated containers 2. The apparatus 1 comprises a basic box structure 3 having a substantially parallelepiped shape, superiorly open and superiorly exhibiting a horizontal wall 4, of substantially rectangular shape with its sides vertically aligned with the vertical lateral walls of the box structure 3 and being part of the base 5 of the apparatus 1 itself. The horizontal wall 4 is connected, by means of vertical walls 6 of substantially rectangular shape connected bilaterally to two of the horizontal wall 4 sides (see FIG. 1), to respective underlying lateral vertical walls 7 (only one of which is illustrated) of the box structure 3, and its side arranged on the right in FIG. 2 (or its posterior side with reference to FIG. 1) is connected to an underlying posterior vertical wall of the box structure 3 by a vertical wall 8 also exhibiting a substantially rectangular shape. The vertical walls indicated by 6 and 7 can be considered as portions of a single vertical wall. A tub 9 is housed in the box structure 3, which tub 9 has a substantially parallelepiped shape and is superiorly open, having its superior edges sealedly connected to respective superior edges or perimetral projections of the box structure 3 by means of horizontal walls 10 (only three of which are represented in FIGS. 1 and 2).

An aperture 11 is arranged frontally in the horizontal wall 10 and has the shape of a lengthened slot extending substantially over the whole length of the horizontal wall 10. The slot 11 places the inside of the box structure 3, or rather the chamber realised between the box structure 3 and the tub 9, in communication with the outside environment and substantially underlies the front edge (see FIG. 1) of the said horizontal wall 4.

At an inferior left portion of the front wall 12 of the box structure 3, a series of horizontal and lengthened apertures 13 are made, which are arranged reciprocally overlying and constitute a grill placing the inside of the box structure 3 in communication with the outside environment.

Inside the tub 9 are housed heating elements, easily movable in a known way, constituted by electrical resistors 14 connected in a way which is not shown in the illustrations to the electrical supply of the room in which the apparatus 1 has been installed.

One of the said vertical walls 6, arranged on the left in FIG. 1, together with the underlying vertical wall 7 of the box structure 3 to which it is sealedly connected, constitutes the wall, arranged on the right in FIG. 1, of a box structure 15 having a substantially parallelepiped shape and arranged adjacent to the left side of the box structure 3. The inside of the said box structure 15 communicates with the chamber existing between the horizontal wall 4 and the box structure 3 through a substantially rectangular aperture 16 equipped with two opposite horizontal sides, made in an upper zone of the said vertical wall 6 arranged on the left in FIG. 1. In practice, as will better emerge hereinbelow, the said box structure 15 defines a recycling conduit 35. Further, at an inferior zone of the wall 7 partially defining a side of the box structure 15, a lengthened aperture 17 is made, the functions of which will better emerge from the description that follows, which aperture 17 is horizontally arranged and has a length interesting the entire inferior zone of the wall 7 in which it is made, in a normal direction to the lie plane of the said front wall 12. The aperture 17 places the box structure 15 inferiorly in communication with the box structure 3.

The lateral walls of the box structure 15 rigidly support, internally to the box structure 15, a plurality of rectangular perforated walls one above the other in a cascade arrangement in vertical direction, which walls have their generating lines horizontal and parallel to the walls 7 and are arranged inclined with respect to a horizontal plane according to equal angles but oppositely on alternate walls starting from the top and moving downwards.

Immediately above the lower wall of the vertical front wall 12 defining frontally, in FIG. 1, the box structure 3, an aperture 19 is made which places the inside of the box structure 3 in communication with the outside environment at a zone arranged immediately above a water-condensation collection tub 20, arranged in front of the said front wall 12 of the box structure 3 with reference to FIG. 1 and superiorly covered by a horizontal and perforated wall. The inside of the said collection tub 20 can be placed in communication, through a conduit 22 with a collection and disposal unit (not illustrated) of usable water and condensation no longer usable by the apparatus 1. It should be noted that the collection tub 20 could communicate with an inferior internal zone of the box structure 15 or with the inside of both box structure 3 and box structure 15.

The box structure 15 contains superiorly, in front of the said aperture 16 which places it in communication with the chamber existing between the box structure 3 and the horizontal wall 4, an aspirating device 23 connected to a bi-directional motor or activating means 24.

FIG. 2 shows that inside the box structure 3 and at one of its median zones on the right (FIG. 2) the wall 7 arranged on the left in FIG. 1 supports rotatably a shaft 25 which is normal to it and which exhibits an end turned towards the box structure 15 connected to a motor or activatable means 26 activatable by a programmable control unit, not illustrated, of which only a control panel 27 is schematically shown in FIG. 1. The shaft 25 rigidly supports with its other end a median portion of a bar 28, which rotatably supports a block 30 by means of a pivot 29, horizontal and normal to the walls 7, with its end arranged inferiorly in FIG. 2. The block 30 is slidably crossed by a rod 31, horizontal and normal to the front wall 12, which rod 31 has its end turned towards the front wall 12 itself connected rigidly to a rod or vertical support element 32. The shaft 25, the bar 28, the pivot 29, the block 30 and the rods 31 and 32 shall be hereinafter defined together as a lift device and shall be denoted by number 33.

The functioning of the apparatus is as follows. Following the action of the electrical resistors 14, the water contained in the tub 9 is kept constantly at boiling point, and the tub 9 is able to receive from above a container 2 containing the food to be cooked. The steam generated by the water contained inside the tub 9 rises to reach the horizontal wall 4, from which it is deviated. Due to the aspirating action exerted by the aspirating device 23 through the aperture 16, the steam enters the box structure 15 continuously through the aperture 16 itself, is forced to descend along the recycling conduit 35 crossing the wall 18 and partially condensing, and is introduced into the box structure 3 through the aperture 17. From the box structure 3 the steam which is not condensed is projected upwards, externally to the box structure 3, through the slot 11, reaching the horizontal wall 4 then to return to the aperture 16 by the action of the said aspirating device 23.

It should be noted that the humid air, already relatively drier than the steam contained in the tub 9, exiting from the slot 11 forms a curtain or barrier of air and steam, indicated in FIGS. 1 and 2 schematically with a plurality of arrows F, which practically completely prevents any exiting of steam from the chamber existing between the box structure 3 and the horizontal wall 4.

The condensed water produced by the passage of the steam through the walls 18 goes through the aperture 19 and reaches the collection tub 20, from which it is periodically removed manually or instead is continuously removed though the conduit 22. A part of the steam condenses while crossing the horizontal apertures 13. Thus, the recycling conduit 35, its aperture 17, the hollow space 36 existing between the tub 9 and the box structure 3, the slot 11 and the horizontal wall 4 together create a recycling circuit which partially condenses the steam produced during the boiling of the water contained in the tub 9.

The motor 26 of the lift device 33 is connected in a known and thus not illustrated way, to the said control unit 27, which activates the motor 26 each time the food contained inside a container 2 is immersed in the tub 9 for all the time necessary for its cooking and each time the container 2 itself, full of food to be cooked, must be immersed in the tub 9.

When the motor 26 is started and moves clockwise according to the arrow F2 (with reference to FIG. 2) the bar 28 performs a rotation about the axis of the shaft 25, and causes a leftwise movement and a raising of the block 30, which runs along the rod 31 and lifts the rod 31 itself as well as the rod 32. Supposing that a container 2 is present in the tub 9, with the food in it just cooked, the upper end of the rod 32, during the course of its raising, engages a hooking element 34 connected to an edge of the container 2, constituted for example by a slot, and produces the raising of the container 2 and its complete exit from the tub 9. Proximity sensors could be present (not illustrated) able to read the end run position of some elements of the lift device 33, to the end of determining more accurately when the motor 26 should stop on the arrival of the container 2 at its completely extracted position, or respectively its inserted position, with respect to the tub 9. Obviously, to perform the immersion of the container 2 in the tub 9 the motor 26 must move in an anticlockwise rotation direction with reference to FIG. 2.

Worthy of note is the fact that the constant presence of humid air between the box structure 3 and the horizontal wall 4 prevents excessive drying-out of the food closed in the container 2, extracted from the tub 9 even in cases where it has not proved possible to tip the food on to a plate or serving dish.

The above description shows how the apparatus 1 fully reaches its aims, since it is able to operate with only a very small emission of steam into the surrounding environment. Furthermore, the apparatus 1 is perfectly able to keep the cooked foods humid and fragrant, even where the foods cannot immediately be tipped on the plates or serving dishes.

What is claimed:

1. An apparatus for at least one of heating and cooking food in water comprising:
  at least a first tub for containing water at boiling temperature and generating steam therefrom, the first tub having upper edges and an open interior;
  heating means disposed in the open interior of the first tub for heating water contained in the first tub;
  at least one perforated container for holding food, the perforated container being positionable in the first tub;
  a first box structure having an open top and an open interior and being connected at the open top to the upper edges of the first tub to define a connection zone between the first tub and the first box structure, the first tub being disposed in the first box structure; and
  a wall disposed above the first tub for intercepting steam exiting from the first tub, the wall and the first tub defining therebetween a chamber;
  wherein a longitudinal aperture is formed in the upper edges of the first tub and disposed along a portion of the connection zone;
  a second box structure having an open interior communicating with the open interior of the first box structure; and
  aspirating means having an inlet communicating with the chamber defined between the first tub and the wall and having an outlet communicating with the open interior of the second box structure.

2. An apparatus as in claim 1, which further comprises a plurality of perforated walls arranged one above another and disposed in the open interior of the second box structure.

3. An apparatus as in claim 2, wherein the perforated walls are arranged inclined with respect to a horizontal plane.

4. An apparatus as in claim 2, which further comprises a second tub for the collection of water, the open interior of at least one of the first and second box structures being in communication with the second tub.

5. An apparatus as defined by claim 1, wherein the first box structure is formed with at least one aperture communicating with the environment external to the apparatus.

6. An apparatus as defined by claim 1, which further comprises automatically activated lift means for lifting the container positionable in the first tub.

7. An apparatus as in claim 6, wherein the automatically activated lift means includes a bidirectional motor means and a vertically movable support element operatively coupled to the motor means to move the container vertically in opposite directions.

8. An apparatus as defined by claim 2, wherein the first box structure is formed with at least one aperture communicating with the environment external to the apparatus.

9. An apparatus as defined by claim 3, wherein the first box structure is formed with at least one aperture communicating with the environment external to the apparatus.

10. An apparatus as defined by claim 4, wherein the first box structure is formed with at least one aperture communicating with the environment external to the apparatus.

11. An apparatus as defined by claim 2, which further comprises automatically activated lift means for lifting the container positionable in the first tub.

12. An apparatus as defined by claim 3, which further comprises automatically activated lift means for lifting the container positionable in the first tub.

13. An apparatus as defined by claim 4, which further comprises automatically activated lift means for lifting the container positionable in the first tub.

14. An apparatus as defined by claim 5, which further comprises automatically activated lift means for lifting the container positionable in the first tub.

15. An apparatus as defined by claim 8, which further comprises automatically activated lift means for lifting the container positionable in the first tub.

16. An apparatus as defined by claim 9, which further comprises automatically activated lift means for lifting the container positionable in the first tub.

17. An apparatus as defined by claim 10, which further comprises automatically activated lift means for lifting the container positionable in the first tub.

* * * * *